US012748768B2

(12) United States Patent
Rai et al.

(10) Patent No.: US 12,748,768 B2
(45) Date of Patent: Sep. 29, 2026

(54) TABLE EXTRACTION FROM IMAGES USING LANGUAGE MODELS

(71) Applicant: Oracle International Corporation, Redwood Shores, CA (US)

(72) Inventors: Avinash Rajeshchandra Rai, Bengaluru (IN); Srikant Panda, Bengaluru (IN); Kulbhushan Pachauri, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/777,023

(22) Filed: Jul. 18, 2024

(65) Prior Publication Data

US 2025/0209085 A1 Jun. 26, 2025

(30) Foreign Application Priority Data

Dec. 22, 2023 (IN) ............................. 202341088141

(51) Int. Cl.
*G06F 16/25* (2019.01)

(52) U.S. Cl.
CPC ................................. *G06F 16/254* (2019.01)

(58) Field of Classification Search
CPC ..... G06F 16/254; G06F 40/205; G06V 30/10; G06V 30/18
See application file for complete search history.

(56) References Cited

U.S. PATENT DOCUMENTS

2022/0044134 A1* 2/2022 Joy .......................... G06N 5/04
2022/0319219 A1* 10/2022 Tsibulevskiy ........... G06F 18/40
2023/0065915 A1* 3/2023 Berestovsky ........... G06F 18/22
2024/0386058 A1* 11/2024 Thomas ................ G06F 40/103
2025/0061308 A1* 2/2025 Chauhan .................. G06N 3/09
2025/0103798 A1* 3/2025 Dixit ...................... G06F 40/177
2025/0117575 A1* 4/2025 Vankina ................. G06N 5/022
2025/0200118 A1* 6/2025 Flores ................... G06F 16/951

OTHER PUBLICATIONS

Vaswani, Ashish et al. "Attention is All you Need.", 31st Conference on Neural Information Processing Systems, NIPS (2017), 11 pages.
Li, Chenxia, et al. "PP-StructureV2: A Stonger Document Analysis System." ArXiv abs/2210.05391 (2022), 8 pages.
Chung, Hyung Won et al. "Scaling instruction-finetuned language models." ArXiv abs/2210.11416v5 (2022), 54 pages.

* cited by examiner

*Primary Examiner* — Courtney Harmon
(74) *Attorney, Agent, or Firm* — Kilpatrick Townsend & Stockton LLP

(57) ABSTRACT

Techniques for extracting tables from images using a Language Model. The techniques include detecting, within an image, an area that includes a table. The techniques further include extracting, from the area of the image, tabular data for the table, the extracted tabular data comprising a plurality of content items in the table and structural information for the table. The techniques further include generating a prompt that includes the plurality of content items and the structural information. The techniques further include providing the prompt as input to a language model. The techniques further include responsive to providing the prompt as input to the language model, generating, by the language model, a parsable representation of the table, wherein the parsable representation is in a format and includes the plurality of content items of the table and the structural information of the table in the image.

20 Claims, 12 Drawing Sheets

500

| **Summary of Current activity** | **Charges** | **Credits** |
|---|---|---|
| See over for details | | |
| Variable charges | $789,672.34 | |
| GST | $118,450.85 | |
| **Total Current Charges** | | **$908,123.19** |

*FIG. 5*

700

| Summary of Current activity see over for details | Charges | Credits | |
|---|---|---|---|
| Variable charges | $789,672.34 | | |
| GST | $118,450.85 | | |
| Total current charges | | | $908,123.19 |

FIG. 7

TABLE EXTRACTION FROM IMAGES USING LANGUAGE MODELS

CROSS-REFERENCE TO RELATED APPLICATIONS

This application a non-provisional of and claims the benefit of and priority to Indian Provisional Patent Application No. 202341088141, filed Dec. 22, 2023, entitled "SYSTEM AND METHOD FOR DOCUMENT TABLE EXTRACTION LEVERAGING LARGE LANGUAGE MODELS," the contents of which are hereby incorporated by reference in their entirety for all purposes.

FIELD

The present disclosure relates to image processing techniques, and more particularly, techniques are disclosed for processing an image to extract tabular data corresponding to a table appearing in the image, the tabular data comprising table structure and table contents, and using a machine learning (ML) model (e.g., a Small Language Model, a Large Language Model (LLM)) to generate a parsable representation of the table based upon the extracted tabular data.

BACKGROUND

Extraction of tables from images has widespread usage in various different domains and industries. With the popularity of imaging devices such as mobile phones with cameras, digital cameras, scanners, screen capture devices, etc., the images captured by these imaging devices include large amounts of data in tabular format. As a result, organizations are building workflows for automatically processing and extracting the data from such images, especially tables appearing in such images. These workflows also preferably would like the extracted table to be stored in a parsable format, which can in turn be used by downstream table processing applications. Extracting tables from images with accuracy is however a non-trivial task. For example, an employee may capture an image of a receipt (in the form of a table) using a mobile phone camera and submit the image to Accounting for reimbursement. Accounting then has to be able to extract the table from the image, determine the contents of the table (e.g., the items and their associated costs, identify the vendor, etc.), and then process the reimbursement. Today, many of these table extraction tasks require manual intervention because current techniques for obtaining tabular data from images do not have the desired level of accuracy and/or cannot handle the large variability that table forms may take in an image. Further, the functionality to store the extracted table in a parsable format is currently done manually. Furthermore, existing techniques can have issues with preserving the position of table information relative to other table information positions.

SUMMARY

The present disclosure relates to image processing techniques, and more particularly to techniques for extracting tables from images using Language Models. Techniques are disclosed for processing an image to extract tabular data corresponding to a table appearing in the image, the tabular data comprising table structural information and table contents for the table, and using an AI model (e.g., a ML model (e.g., a Large Language Model (LLM), a Small Language Model)) to generate a parsable representation of the table based upon the extracted tabular data.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

In certain implementations, the techniques described herein use language models to extract tables from images. The techniques including a method. The method comprising detecting, within an image, a first area that includes a first table. The method further comprising extracting, from the first area of the image, tabular data for the first table. The extracted tabular data may comprise a first plurality of content items in the first table and first structural information for the first table. The method further comprising generating a prompt that includes the first plurality of content items and the first structural information. The method further comprising providing the prompt as input to a first language model. The method further comprising responsive to providing the prompt as input to the first language model, generating, by the first language model, a first parsable representation of the first table. The first parsable representation can be in a first format and includes the first plurality of content items of the first table and the first structural information of the first table in the image.

Implementations of the method may include one or more of the following features. The method where extracting the tabular data of the first table may include: extracting each content item in the first plurality of content items from the first area of the image. Extracting the tabular data may include: for each content item in the first plurality of content items, determining, location information for the content item, the location information for the content item indicative of a location of the content item within the image. The first structural information for the first table may include the location information for the first plurality of content items represented. The method may include at least one content item included in the first plurality of content items that includes at least one of: a word, a character, a symbol, or a value. The first structural information may include at least two coordinate values identifying a bounding box around the at least one content item.

The first format may be at least one of: a hypertext markup language (HTML) format, an extensible markup language (XLM) format, or a comma separated values (CSV) format. The image may be represented in a second format, different than the first format, the second format being at least one of: a portable document format (PDF), a joint photographic expert group (JPEG) format, a portable network graphics (PNG) format, tag image file format (TIFF), or a graphic interchange format (GIF). The method may include: receiving a request from a requester to perform a table extraction operation on the image, the request further identifying the first format, and transmitting the first parsable representation of the first table to the requester.

The image may include a second table and the method may further include: detecting, within the image, a second area that includes the second table. The method may further include extracting, from the second area of the image, second tabular data for the second table. The extracted second tabular data may include a second plurality of content items in the second table and second structural information for the second table. The method may further include generating a second prompt that includes the second plurality of content items and the second structural information. The method may further include providing the second prompt as input to the first language model and responsive to providing the second prompt as input to the first language model, generating, by the first language model, a second parsable representation of the second table. The second parsable representation can be in a second format and include the second plurality of content items of the second table, and the second structural information of the second table in the image. The first table can be in a first orientation in the image and the second table can be in a second orientation in the image, where the second orientation is different than the first orientation.

The image can include a second table and the method may further include: detecting, within the image, a second area that includes the second table. The method may further include extracting, from the second area of the image, second tabular data for the second table. The extracted second tabular data may include a second plurality of content items in the second table and second structural information for the second table. The method may further include generating a second prompt that includes the second plurality of content items and the second structural information. The method may further include providing the second prompt as input to a second language model different from the first language model. Responsive to providing the second prompt as input to the second language model, the method may further include generating, by the second language model, a second parsable representation of the second table, where the second parsable representation is in a second format and includes the second plurality of content items of the second table, and the second structural information of the second table in the image. The method may include: creating a single joined parsable representation that includes both the first parsable representation of the first table and the second parsable representation of the second table. The prompt further may include: one or more examples including a first example, where the first example may include a first portion and a second portion. The first portion may identify a plurality of example content items and corresponding example structural information for each example content item in the plurality of example content items. The second portion may identify an example parsable representation corresponding to the first portion.

The techniques including a system. The system may comprise one or more storage media storing instructions and one or more processors configured to execute the instructions to cause the system to perform processing. The processing may comprise detecting, within an image, a first area that includes a first table. The processing may further comprise extracting, from the first area of the image, tabular data for the first table. The extracted tabular data comprising a first plurality of content items in the first table and first structural information for the first table. The processing may further comprise generating a prompt that includes the first plurality of content items and the first structural information. The processing may further comprise providing the prompt as input to a first language model. Responsive to providing the prompt as input to the first language model, the processing may further comprise generating, by the first language model, a first parsable representation of the first table. The first parsable representation can be in a first format and include the first plurality of content items of the first table and the first structural information of the first table in the image.

Implementations may include one or more of the following features. The system where the processing further includes: extracting each content item in the first plurality of content items from the first area of the image. The processing may further include: for each content item in the first plurality of content items, determining, location information for the content item, the location information for the content item indicative of a location of the content item within the image. The first structural information for the first table may include the location information for the first plurality of content items represented. The processing may further include: fine tuning the first language model to enable the first language model to extract tables from images. Providing the prompt as input to the first language model may include providing the prompt to the first language model after performing the fine tuning. Fine-tuning the first language model may include performing at least one of: full fine-tuning, parameter efficient fine-tuning. The first language model can be a decoder-only model or an encoder-decoder model.

Techniques may include one or more non-transitory computer-readable storage media storing instructions that, upon execution by one or more processors of a system, cause the system to perform operations. The operation may comprise detecting, within an image, a first area that includes a first table. The operation may further comprise extracting, from the first area of the image, tabular data for the first table. The extracted tabular data can include a first plurality of content items in the first table and first structural information for the first table. The operation may further comprise generating a prompt that includes the first plurality of content items and the first structural information. The operation may further comprise providing the prompt as input to a first language model. Responsive to providing the prompt as input to the first language model, the operation may further comprise generating, by the first language model, a first parsable representation of the first table where the first parsable representation is in a first format and includes the first plurality of content items of the first table and the first structural information of the first table in the image. In some implementations, extracting the tabular data for the first table comprises using an optical character recognition technique.

The foregoing, together with other features and embodiments will become more apparent upon referring to the following specification, claims, and accompanying drawings.

BRIEF DESCRIPTION OF THE DRAWINGS

FIG. 5 is an example of an image that may be input to a table extraction system, according to an example embodiment.

FIG. 7 is an example of a rendering generated by an example output generated by a table extraction system, according to an example embodiment.

DETAILED DESCRIPTION

Figure 1:
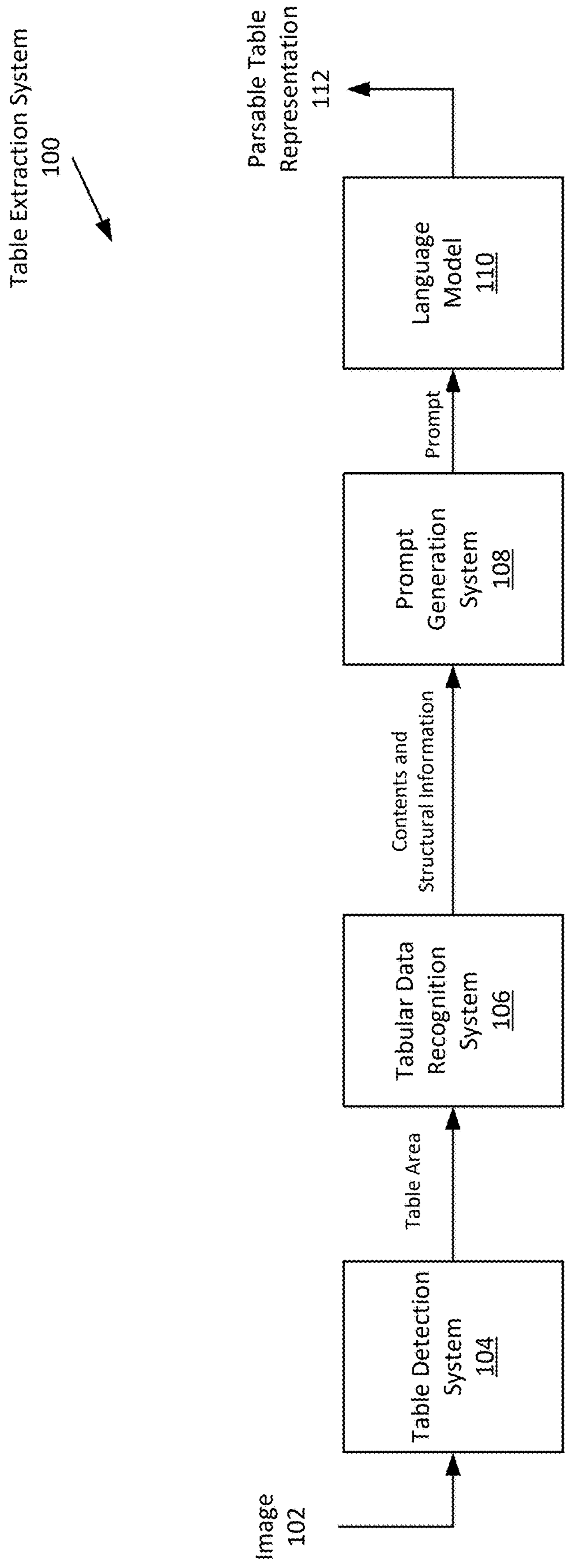
FIG. 1 is a simplified block diagram of a table extraction system, according to an example embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to image processing techniques, and more particularly to techniques for extracting tables from images using Language Models. Techniques are disclosed for processing an image to extract tabular data corresponding to a table appearing in the image, the tabular data comprising table structure and table contents for the table, and using an AI model (e.g., a Large Language Model (LLM), a Small Language Model) to generate a parsable representation of the table based upon the extracted tabular data.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

In certain implementations, a request may be received to extract one or more tables from an image. The image is processed to identify an area of the image that contains a table. Tabular data for the table is then extracted from the identified area of the image. The tabular data can include the contents of the table, where the contents can include one or more content items (e.g., words) in the table. The extracted tabular data can also include structural or spatial information for the table. The extracted structural information may include, for example, for each extracted content item, information indicative of the position of the content item in the image or within the area of the image. A prompt is then generated based on the extracted tabular data including the extracted content items and their associated structural information. The prompt is provided as input to a language model, which then generates a parsable representation of the table. The parsable representation includes information indicative of the structure of the table (e.g., position and size of the cells of the table) and information indicative of the content of the table (e.g., words present in the cells of the table).

In certain implementations, the parsable representations can be generated with one or more different formats. Examples of different formats for the parsable representation include HyperText Markup Language (HTML) format, an Extensible Markup Language (XLM) format, Yet Another Markup Language (YAML) format, JavaScript Object Notation (JSON) format, spreadsheet format (e.g., MS Excel format), a comma separated values (CSV) format, and others. The request for the table extraction may identify a particular desired format for the parsable representation, and the language model then generates the parsable representation in that requested format. In certain implementations, the same language model may be tuned and/or able to generate the parsable representation in different formats. In some other implementations, different versions of tuned language models may be used to generate the parsable representation in different formats. For example, in certain implementations, a language model may be trained and/or tuned to output the parsable representation as HyperText Markup Language (HTML) format. In another implementation, a language model may be trained and/or tuned to output the parsable representation as Yet Another Markup Language (YAML) code. In another implementation, a language model may be trained and/or tuned to output the parsable representation in JavaScript Object Notation (JSON) format.

The input image from which one or more tables are to be extracted can also be received in different forms and formats. The input image can be in the form of a photograph, a scanned document, a screenshot, an image created using an image editing program, and the like. The input image can be in different formats (e.g., different file types) such as in a Portable Document Format (PDF), a Joint Photographic Expert Group (JPEG) format, a Portable Network Graphics (PNG) format, a Graphic Interchange Format (GIF), a Tag Image File Format (TIFF), and other formats used for images.

The techniques described herein can accurately extract tables from images in a fast and resource-efficient way. While techniques (e.g., ML models) have been used in the past to extract tables from images, these techniques suffered from several deficiencies. The table extraction was not accurate. The ML models had to be extensively trained requiring significant memory and compute resources, and large amounts of time. Further, large amounts of training data (e.g., task specific training data) was required for the training. The techniques described herein instead use novel prompting techniques and language model to perform the table extraction from images that avoid the problems associated with existing techniques. The language models are already trained and can be customized for the table extraction task using fine tuning and by using novel prompting techniques. The fine tuning can be performed using a relatively small amount of data. The techniques described herein are thus able to extract tables from images more accurately, using less time and resources (e.g., memory resources, compute resources, human resources) than previous techniques. Additionally, using the techniques described herein, the extracted table is output in a parsable representation that preserves both the contents and the structure of the table. The parsable representation can also be generated in different user-selectable output formats.

FIG. 1 is a simplified block diagram of a table extraction system 100, according to an example embodiment. The table extraction system 100 may include a table detection system 104, a tabular data recognition system 106, a prompt generation system 108, and a language model 110. The table extraction system 100 may be configured to receive an image 102 and generate a parsable table representation 112 using image 102.

Image 102 received by the table extraction system 100 may be an image represented by a defined image file format (e.g., an image-only Portable Document Format (PDF), a Joint Photographic Expert Group (JPEG) format, a Portable Network Graphics (PNG) format, Tag Image File Format (TIFF), or a Graphic Interchange Format (GIF), etc.). In certain embodiments, image 102 may be a frame of a video. Image 102 may include one or more tables of data. The image 102 may be of a document, a scanned page, a photograph, or a screenshot.

Image 102 may have been received from a database of images (e.g., on a server, on a user device), from an application, or from a cloud service. Image 102 may be processed as part of processing a set of one or more images. Image 102 may be selected for processing based on user input received by a user device (e.g., a mobile phone, a personal computer, a tablet, a camera, etc.). Image 102 may be identified by a request (e.g., from the user device) to generate the parsable table representation 112 of one or more tables in image 102. The request may include an indication of where to transmit and/or store the parsable table representation 112. The request may include an indication of a language model to use and/or a format (e.g., HTML) for representing the parsable table representation 112. The request may indicate that the parsable table representation 112 is to be transmitted to the requestor.

The one or more tables of data that can be included in image 102 may include simple or complex structures, and may not be uniformly formatted and include an arbitrary format. A table of data in image 102 may be characterized by a structure (e.g., table boundary, cell boundaries, word locations, phrase locations, character locations, value locations) and content (e.g., words included in a cell of the table, numbers included in the table).

In certain embodiments, the table may include an arbitrary number of rows, an arbitrary number of columns, size (e.g., cell count, pixel width, file size), orientation (e.g., off-center, rotated), cells, and/or headers. The tables of data may be characterized by any number of rows and columns. The rows and columns may be of varying heights and/or widths. The rows and columns may define cells. Cells may be defined based on columns, rows, and/or table boundaries. The table may have one or more attributes, the attributes may be associated with the one or more content items. A cell may include any number (e.g., zero or more) content items. Content items are described below in further detail.

In an example, cells of a table may include a structure, content, and/or attributes. The content included in a cell may be characters, words, images, symbols, numbers, etc. The cell may include attributes such as a background color, a text color, and/or shading, etc. The cell may be defined by the intersection of one or more rows and/or columns. As a further example, the cell may be defined by the intersection of one row and one column. As a further example, the cell may be defined by the intersection of one row and two or more columns and may be referred to as a merged cell.

When image 102 includes at least the table and a second table, the second table may or may not have the same structure, content, orientation, and/or attributes as the first table.

The table detection system 104 may be configured to receive image 102. The table detection system 104 may be configured to detect a table location area. The table detection system 104 may output the detected table location area.

The table location area may indicate a boundary of one or more tables included in the image 102 (e.g., one or more boundaries). For example, if image 102 includes one table, the table location area may include a boundary for the one table. In an example where image 102 includes two tables, the table location area may include two boundaries, one for each table.

The boundaries of a table in image 102 may be defined by coordinates. The boundaries may be defined by a first (X, Y) coordinate position and a second (X, Y) coordinate position (e.g., pixel coordinate, with respect to an origin). The first coordinate position and the second coordinate position may be used to determine the left edge, right edge, top edge, and bottom edge, (e.g., an area) of image 102 including a table to be further analyzed using the table extraction system 100. In certain embodiments, the boundaries may be defined by more than two coordinates (e.g., four coordinates that identify four corners of a table, a coordinate to identify each corner of a table, coordinates to identify corners and/or edges of a table, etc.).

In certain embodiments, the defined boundaries for each table may have a combined pixel area larger or smaller than the pixel area of the image 102 they were defined from. For example, the table detection system 104 may determine that a single table is included in the image 102 (e.g., an image). The table detection system 104 may determine the boundaries of the table to be equivalent to the boundaries of the image and output a table location area corresponding to the boundaries (e.g., pixel boundaries, coordinate boundaries) of the image 102. In certain embodiments, the table detection system 104 may determine the boundaries of the table to be a boundary with a table location area that is a subset of the pixel area within image 102. For example, the boundary may more closely correspond to the boundaries of the table included in a subset of image 102. The table detection system 104 may be configured to output table location area information including an area corresponding to a cropped instance of each table in image 102. In certain embodiments, a first defined table boundary may overlap with a second defined boundary.

The table detection system 104 may include an object detection model. The object detection model may have been trained and/or tuned to detect tables. The object detection model may have been trained and/or tuned to detect a particular type of table (e.g., a nested table, an XY table, a grouped table, a contingency table, a multi-column table, a multi-row table, a two-way table, a three-way table, a diamond-shaped table, etc.

Each table location area detected by the table detection system 104 may be transmitted to the tabular data recognition system 106 and/or prompt generation system 108. For example, the table location area may be used by the tabular data recognition system 106 and/or prompt generation system 108 to analyze a corresponding portion of image 102. In certain embodiments, each table location area detected by the table detection system 104 causes a second image to be generated that includes the table location area of image 102, before the second image is then transmitted to the tabular data recognition system 106 or the prompt generation system 108.

In certain embodiments, at least some of the tabular data recognition system 106 functions are performed before the table detection system 104 functions. In certain embodiments, at least some of the tabular data recognition system 106 functions are performed in parallel with the table detection system 104 functions. In certain embodiments, image 102 may be transmitted to the tabular data recognition system 106 without first being processed by the table detection system 104. In an example, the table detection system 104 may not be used when it is known that image 102 does not include more than one table. In an example, the table detection system 104 may not be used when the table extraction system 100 is configured to extract any number of parsable table representations 112 from the image 102 without performing any joining of parsable table representations 112.

The tabular data recognition system 106 may receive the table location area information determined by the table detection system 104 and/or receive the image 102. The tabular data recognition system 106 may receive one or more images and/or one or more table location areas.

In certain embodiments, the tabular data recognition system 106 may perform processing on image 102 to determine a set of one or more content items and structural information based on the content and the structure. The set of one or more content items may be indicative of the content of the table. Each content item may be associated with the structural information indicative of the structure of the table.

A content item included in the set of content items may include at least one of: one or more words (e.g., "Summary of Current Activity"), one or more characters (e.g., "Variable," "V"), one or more symbols (e.g., "$," "%," etc.), or one or more values (e.g., "1," "20," etc.). In certain embodiments, a content item may include an image, emoji, etc.

In certain embodiments, a content item can be associated with one or more attributes. An attribute may represent a font, a font size, highlighting, bolding, italicizing, underlining, color, background, spacing, alignment, border, and/or other formatting. The attribute association with a content item can cause the output parsable table representation 112 to include such attributes that were represented in the table included in image 102.

Tabular data recognition system 106 may perform processing on the entire image 102 and image 102 may include one or more tables. In certain embodiments, tabular data recognition system 106 performs processing on a portion of image 102 defined by the table location area determined to include a table. In certain embodiments, tabular data recognition system 106 performs the processing on image 102 more than once, each time the processing is performed concerning a single table location area of image 102 determined by the table detection system 104 for the image.

Tabular data recognition system 106 may include an optical character recognition (OCR) model or one or more other character recognition techniques. The OCR model may have been trained and/or tuned to recognize content items such as characters, words, symbols, icons, clipart, images, etc. The OCR model may have been trained and/or tuned to recognize characters from a particular language. The OCR model may have been trained and/or tuned to recognize the position of detected content items (e.g., the structural information associated with content items).

Tabular data recognition system 106 may determine the set of one or more content items included in the area of image 102 defined by the table location area. The set of content items may be indicative of the content included in the table. The set of content items or a portion of the set may be included in a cell of a table within the area of image 102 defined by the table location area. A content item included in the table may include column title information, row title information, subtitle information, units of measurement, data values, characters, etc. As previously described, the table location area may have been defined by image 102 and/or by table detection system 104.

The structural information may include position/location information (e.g., coordinates, center) of content item boundaries (e.g., corners, sides, height, width). The structural information may be defined by a first content item (X, Y) coordinate position and a second content item (X, Y) coordinate position. The first content item coordinate position and the second content item coordinate position may identify a bounding box around one or more content items. The first content item coordinate position and the second content item coordinate position may be used to determine the left edge, right edge, top edge, and/or bottom edge, (e.g., an area) of a cell. The structural information associated with a content item may be defined by more than two coordinates (e.g., four coordinates that identify four corners of a table, a coordinate to identify each corner of a table, coordinates to identify corners and/or edges of a table, etc.). The structural information may indicate a cell that a corresponding content item appears in (e.g., cell 1, cell 1-2). The structural information may include further information about a center, a width and a height of the bounding box.

In an example, tabular data recognition system 106 is capable of determining that a content item in a cell of the table is "city" or "c", or "city name" and that the structural information associated with the content item is defined by a first content item coordinate position at (10, 10) and a second content item coordinate position at (30, 20). The tabular data recognition system 106 may determine any number (e.g., zero or more) of content items and associated structural information included in image 102 and/or the table location area of image 102. In an example, tabular data recognition system 106 is capable of receiving image 102 and generating information (contents and structural information) indicating the position and corresponding content of information (e.g., tabular information) included in image 102.

Tabular data recognition system 106 may determine the structural information (e.g., bounding boxes, position) of the determined content items. The structural information may be indicative of the structure of the table (e.g., a position of one or more content items with respect to one or more other content items, a position of one or more content items with respect to an origin). The tabular data recognition system 106 may associate the content items with the structural information. The tabular data recognition system 106 may store and/or transmit the association of the content items to the structural information.

In certain embodiments, the aggregated structural information of one or more cells may be used to determine the table location area. In a non-limiting example, if the position of all cells in a table is known, the table location area for the table may also be known by virtue of knowing where all cells of the table are located. In certain embodiments, the structural information obtained by the tabular data recognition system 106 may be compared with the table location area determined by the table detection system 104. Such a comparison may be useful to validate the table location area determined by the table detection system 104 and/or the tabular data recognition system 106.

The tabular data recognition system 106 may transmit content (e.g., the content items) and the structural information associated with the content (e.g., the set of content items) to prompt generation system 108 and/or table detection system 104. In certain embodiments, table detection system 104 may determine the table location area after the content and the structural information associated with the set of content is determined by tabular data recognition system 106.

Prompt generation system 108 may receive the content (e.g., the set of one or more content items) and the structural information associated with the content (e.g., the set of content items). In certain embodiments, prompt generation system 108 may additionally receive the table location area from tabular data recognition system 106 and/or table detection system 104.

Prompt generation system 108 may be configured to generate a prompt based on the set of content items, and the structural information associated with the set of content items. The prompt may be generated using at least some of the set of content items and at least some of the structural information associated with the set of content items. The generated prompt may include structural information associated with the set of content items, one or more content items from the set of content items, one or more prompt part identifiers, one or more instructions, one or more tasks, one or more contexts, one or more examples of task performance and/or an indication of the table location area.

The structural information may be the structural information received by prompt generation system 108 and associated with the content information. The structural information may indicate the structure of the table (e.g., positional information of the table and/or the set of content items).

The set of content items may be the set of content items received by prompt generation system 108 and associated with the structural information. The set of content items may represent content included in the table.

The prompt part identifier may indicate which text of the prompt corresponds to the structural information, the contents (or content items therein), one or more instructions, one or more tasks, one or more contexts, one or more examples of task performance, attributes, and/or the table location area, etc. The contents (or content items therein), one or more instructions, one or more tasks, one or more contexts, one or more examples of task performance, attributes, and/or the table location area, etc. may be included based on user input and or other input received by the table extraction system 100. In certain embodiments, if no such input is received, a default value is used in the prompt and/or assumed by the language model.

In certain embodiments, the prompt part identifier may be inserted within the prompt and included on each end of the corresponding prompt text. For example, the prompt part identifier "[STRUCTURAL_INF]" may be inserted into the prompt text before and after the structural information "40:10:55:20" to cause the corresponding portion of the prompt to recite: "[STRUCTURAL_INF] 40:10:55:20 [STRUCTURAL_INF]" and indicate that the "40:10:55:20" is structural information. In certain embodiments, the prompt part identifier may be inserted within the prompt and included on one end of the corresponding prompt text. For example, the prompt part identifier "[STRUCTURAL_INF]" may be inserted into the prompt text after the structural information "40:10:55:20" to cause the corresponding portion of the prompt to recite: "40:10:55:20 [STRUCTURAL_INF]" and indicate that any prompt text between the preceding prompt part identifier and the [STRUCTURAL_INF] is structural information (e.g., "40:10:55:20" is structural information). One of ordinary skill in the art with the benefit of the disclosure would recognize other ways in which the prompt part identifier may be used to indicate which portions of prompt text correspond to structural information, the content information, one or more instructions, one or more tasks, one or more contexts, and/or one or more examples of task performance, etc.

In an example prompt, the prompt part identifiers "[START]", "[T_START]", "[W_SEP]", "[T_END]", "[I_START]", and "[I_END]" may be inserted to represent a start of the prompt, the start of a token for the prompt text which represents one or more content items and at least a portion of the structural information, a word separator, an end of the token for the prompt text which represents the one or more content items and at least the portion of the structural information, start of an instruction for the language model 110, end of an instruction for the language model 110, respectively. An example prompt may include "[START][T_START]'city' is located at 10:10:30:20 [W_SEP] 'state' is located at 40:10:55:20[T_END][I_START] Generate HTML code:[I_END]".

One or more instructions (which may also be referred to as "tasks") may be included in the generated prompt. The instruction may be used to give a direction or order to the language model 110. The instruction may be used to give direction to the language model 110 for an output to generate. The instruction may detail how something should be done. An example instruction may be "Generate HTML code". In certain embodiments, the instruction may include one or more characters, values, and/or symbols, etc. that may help the language model 110 interpret the instruction and/or prompt. As a second example, an instruction may include "Generate HTML code:". In the second example, the instruction includes ":", which may be part of the instruction. The instruction may be determined based on prompt engineering, based on the training performed for the language model 110, based on tuning performed for the language model 110, and/or based on previous inference results from the language mode 110, etc. The instructions may indicate a format for the parsable table representation 112 to be represented in. In certain embodiments, if no instruction indicating the format for the parsable table representation 112 to be represented in is included in a prompt, the language model generates the parsable table representation 112 in a default format.

One or more contexts may be included in the generated prompt. The context may provide the language model 110 with external information or additional context that can steer the language model 110 to a response. For example, a context included in the prompt text may include: "your job is to generate a table with given information", "you are a table generation tool for professionals", etc.

The one or more examples of task performance may be included in the context. The example task performance may provide the language model 110 with example input and/or output. The example task performance may serve as conditioning for subsequent performance of the language model 110. The example task performance may include a one-shot prompt (one example task performance), a few shot prompt (e.g., multiple examples of task performance), etc. The one or more examples may include a first example. The first example, may include a first portion (e.g., example input) and a second portion (e.g., example output). The first portion may identify one or more example content items and corresponding example structural information for each example content item of the one or more example content items. The second portion may identify an example parsable representation corresponding to the first portion. The example parsable representation may have a format that corresponds to the format to be output by the language model 110.

As an example, a prompt may include a single example of task performance (e.g., one shot prompt) and tabular data to be reflected in a parsable table representation 112. The example prompt may include the prompt text: "[START][T_START]'Previous activity' is located at 9:13:261:51[W_SEP]'Charges' is located at 608:11:736:54[W_SEP]'Credits' is located at 879:11:993:51[W_SEP]'Previous balance' is located at 11:59:252:96[W_SEP]'−$143.41' is located at 1097:58:1237:98[W_SEP]'Opening balance' is located at 11:106:260:141[W_SEP]'−$143.41' is located at 1096:102:1237:142[T_END][I_START] Generate HTML code:[I_END]<html><body><table><tbody><tr><td> Previous activity</td><td>Charges</td><td>Credits</td><td></td></tr><tr><td>Previous balance</td><td></td><td></td><td>−$143.41</td></tr><tr><td>Opening balance</td><td></td><td></td><td>−$143.41</td></tr></tbody></table></body></html>[END][START][T_START]'Previous activity' is located at 9:13:261:51[W_SEP]'Charges' is located at 609:12:734:52[W_SEP]'Credits' is located at 876:9:993:54[W_SEP]'Previous balance' is located at 11:62:253:96[W_SEP]'$506.24' is located at 1106:58:1239:98[W_SEP]'Total previous charges' is located at 9:105:348:142[W_SEP]'$506.24' is located at 1106:102:1239:142[T_END][I_START]Generate HTML code:[I_END]".

Other information and prompt part identifiers included in the prompt text may indicate other information that may be included in the generated prompt such as an attribute (e.g., a color, font style, font size, etc.).

The generated prompt may be used as input to a language model 110. In certain embodiments, the language model 110 is an encoder-decoder model or a decoder only model. The language model 110 may have been pre-trained or fine-tuned (e.g., full fine-tuning, parameter efficient fine-tuning). Full fine-tuning may adjust all parameters of the language model 110 using task-specific data. Full fine-tuning may be similar to training the language model 110 but be performed using a smaller dataset. Parameter efficient fine-tuning may modify select parameters for more efficient adaption of the language model 110 to a specific task. Parameter efficient fine-tuning can be useful when the language model 110 is well developed with broad knowledge. Fine-tuning the language model 110 may tune the language model 110 to receive input similar to the generated prompt. In certain embodiments, the language model 110 has not been fine-tuned for receiving the generated prompt.

The generated prompt may enable the language model's capabilities (e.g., a transformer's capabilities) to extend such that the language model can determine the structured relation between the input data. The language model may be a probabilistic language model, a neural network-based language model, a small language model, a large language model, and/or a GPT language model, a BERT language model, etc.

In certain embodiments, image 102 includes more than one table and one or more prompts are generated for input to the language model 110, and the one or more parsable table representations 112 from the language model 110 may be combined (e.g., combining produced parsable table representation HTML files) into a single joined parsable table representation. In certain embodiments, image 102 includes more than one table, a first prompt is generated for input to the language model 110, and a second prompt is generated for input to a second language model (e.g., the same or different language model as the LLM 110). The prompts may be input to the first or second language model based on the desired output, the input, and/or an account associated with the table extraction system 100, etc.

The language model 110 may generate the parsable table representation 112. Output that is parsable may be output that can be syntactically analyzed into its component parts. The parsable output may be interpretable by compilers and/or interpreters. The parsable output may include a defined data structure. The parsable table representation 112 may include a HyperText Markup Language (HTML), an Extensible Markup Language (XLM), or comma separated values (CSV), YAML, and/or other format. A parsable representation may have any number of the following characteristics: searchable, editable, and/or structured. A parsable representation may include recognizable tokens or elements a parser can identify. A parser may be a software component that processes the parsable representation to detect meaningful information and/or structure. The parser may be a code parser, configured to interpret code written in a programming language or a file in a particular format.

The parsable table representation 112 may be provided to a downstream consumer. The downstream consumer may be a user device, a storage system, an artificial intelligence model, an artificial intelligence model training and/or tuning system, and/or an application. The downstream consumer may have requested the parsable table representation 112 and/or that the parsable table representation 112 be extracted from image 102.

The processing depicted in flow diagrams 200, 300, and 400, and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in flow diagrams 200, 300, and 400, other FIGS., and described herein are intended to be illustrative and non-limiting. Although flow diagrams 200, 300, and 400, and other FIGS. depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in flow diagrams 200, 300, and 400, and other FIGS., may include a greater number or a lesser number of steps than those depicted in the respective FIGS.

Figure 2:
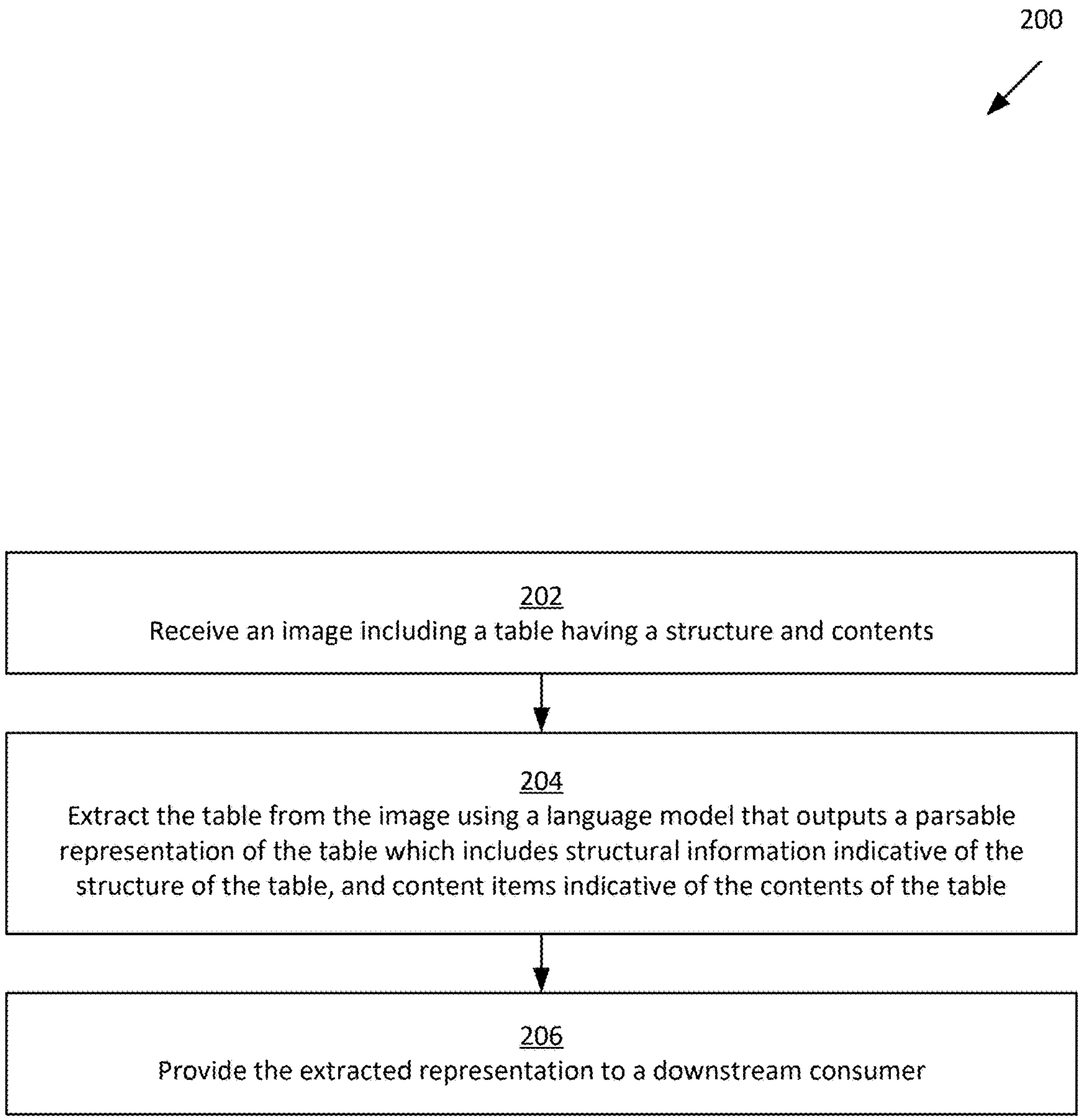
FIG. 2 is a first simplified flow diagram for generating a parsable table using an image, according to an example embodiment.

FIG. 2 is a first simplified flow diagram 200 for generating a parsable table using an image, according to an example embodiment. The flow diagram illustrates an exemplary process that may be performed by one or more components of the table extraction system 100 described above.

At 202, an image may be received. The image may be received by a table extraction system (e.g., table extraction system 100), table detection system (e.g., table detection system 104) and/or a tabular data recognition system (e.g., tabular data recognition system 106). The image may be the image 102 described above. The image may include one or more tables. A table in the image may include a structure and content. Structure and content of a table have been described in more detail above.

The image may be received from a user device (e.g., a mobile phone, a personal computer, a tablet, a camera, etc.), a program, an application, or a cloud service. The image may be received from a repository of images. The image may correspond to a request (e.g., from the user device) to generate an extracted representation of the image. The request may include an indication of where to transmit and/or store the extracted representation of the image. The request may include a specified format for the parsable table to be represented by or other information used to influence the generation of the parsable table.

At 204, the table included in the image may be extracted. The table may be extracted from the image using an artificial intelligence model such as an language model.

The artificial intelligence model may be configured to receive a prompt. The prompt may be generated based on the structure and/or content of the table. The prompt may be generated based on a set of content items and/or structural information that are obtained from the table and represent the content and/or structure of the table.

The set of content items may be obtained using the information recognition system. The set of content items may be obtained from one or more tables included in the image. The set of content items may include zero or more content items. The content items may be obtained using an optical character recognition model or one or more other character recognition techniques. In certain embodiments, the set of content items is obtained using more than one optical character recognition model. For example, a first optical character recognition model may be used to determine at least one content item included in the set of content items and a second optical character recognition model may be used to determine at least another content item included in the set of content items. Using more than one optical character recognition model may enable the information recognition system to recognize different content items (and/or structural information) with increased accuracy (e.g., a character recognition model may be specialized for recognizing one or more categories of content items).

The structural information may be obtained from the table detection system and/or the information recognition system. The structural information may be obtained using an optical character recognition model or one or more other structure recognition techniques. The recognition technique may be the same technique used to obtain content items from the table. The optical character recognition model may be the same optical character recognition model used to obtain the set of content items.

The artificial intelligence model may be configured to generate output. The output may be an extracted representation of the table included in the image. The output may be parsable. Output that is parsable may be output that can be syntactically analyzed into its component parts. The parsable output may be interpretable by compilers and/or interpreters. The parsable output may include a defined data structure.

The output may include structural information indicative of the structure of the table and/or the content of the table. The output may include content items indicative of the content of the table in the image and/or the extracted table representation.

At 206, the extracted representation (e.g., the output generated by the artificial intelligence model) may be transmitted to a downstream consumer. The downstream consumer may be a user device. The downstream consumer may be a storage system, an artificial intelligence model training and/or tuning system, and/or an artificial intelligence model inference system, etc.

Figure 3:
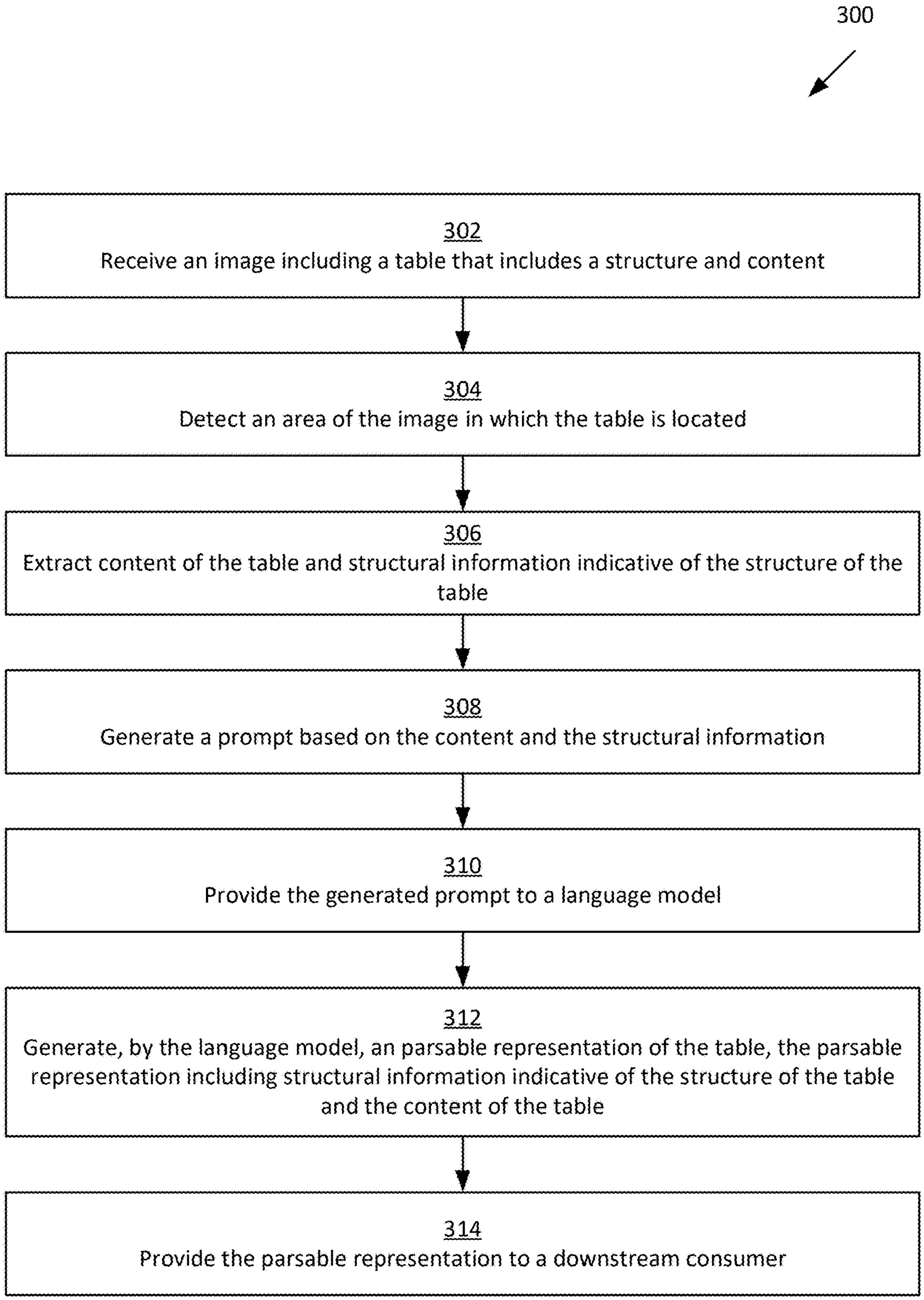
FIG. 3 is a second simplified flow diagram for generating a parsable table using an image, according to an example embodiment.

FIG. 3 is a second simplified flow diagram 300 for generating a parsable table representation using an image, according to an example embodiment. The second flow diagram 300 illustrates an exemplary process that may be performed by one or more components of the table extraction system 100 described above.

At 302, an image may be received that includes a table. The table may include a structure and content. Block 302 may be similar to block 202 described above.

At 304, an area of the image may be determined. The area of the image may include a table. The table location area of the image may be determined using a table detection system (e.g., table detection system 104). The table detection system may perform similar processing as the table detection system described above. The table detection system may be configured to detect a certain type of table, certain types of tables, tables included in certain image formats (e.g., tables included in a PNG image, tables included in a JPEG image). The table detection system may be configured to output the determined table location area. The table location area may be represented using coordinates (e.g., with respect to an origin), pixels (e.g., width×height), etc.

The determined table location area of the image in which the table is located may include less area than the image. For example, an image may include objects, words, or other information that is not included in a table. In the example, the image could include a table in the bottom half of the image and the top half of the image may not include the table. In the example, the table detection system may determine a table location area that corresponds to the bottom half of the image. Accordingly, the table location area may be defined to include one or more pixels of the bottom half of the image and exclude one or more pixels of the top half of the image.

The determined table location area of the image in which the table is located may include the same amount of area as the image. In an example, the image includes a single table (e.g., represented by most of the image pixels, represented by all of the image pixels, represented by a minority of the image pixels) and therefore the whole image may be considered as the table location area.

The determined table location area of the image in which the table is located may include more area than the image. For example, pixels may be added to the image before the image is processed by an information recognition system. The pixels may be added to increase the image size to a necessary size, to align the table within the larger image differently than in the received image, and/or to increase the effectiveness of the information recognition system, etc.

At 306, tabular data may be extracted from the table. The tabular data may include content and/or structural information. The content may include a set of content items. The set of content items may be indicative of the content of the table. The set of content items may be associated with structural information indicative of the structure of the table. The structural information of the table may also be extracted. The set of content items and/or the structural information of the table may be extracted from the image in an area defined by the table location area that includes the table. The set of content items and/or the structural information of the table may be extracted using one or more information recognition systems (e.g., the tabular data recognition system 106). In certain embodiments, an information recognition system may be selected and used based on the image type, a detected table type, to extract the set of content items, and/or to extract the structural information. The set of content items and/or the structural information may be extracted from the table using an optical character recognition model or one or more other character recognition techniques.

At 308, a prompt may be generated based on the set of content items and the structural information determined in block 306. In certain embodiments, the prompt includes the table location area that was determined in step 304. The prompt may be generated by a prompt generation system (e.g., prompt generation system 108). The prompt may include prompt text. The prompt text may include the structural information associated with the set of content items, one or more content items from the set of content items, one or more prompt part identifiers, one or more instructions, one or more tasks, one or more contexts, and/or one or more examples of task performance as described above. The prompt may be generated based on the artificial intelligence model (e.g., language model) the prompt is going to be input to.

At 310, the prompt generated at block 308 may be provided to the artificial intelligence model. The artificial intelligence model may be a language model (e.g., language model 110 described above). The artificial intelligence model may be selected from a set of one or more artificial intelligence models. The artificial intelligence model may be selected to receive the prompt based on information included in the prompt text, a user associated with the table extraction system, etc.

At 312, the artificial intelligence model (e.g., the language model) may generate a parsable representation of the table. The parsable representation may include at least a portion of the structural information. The parsable representation may include at least one content item from the set of content items. The structural information may be indicative of the structure of the table of the image and/or the parsable representation of the table. The at least one content item may be indicative of the content of the table of the image and/or the parsable representation of the table. The parsable representation of the table may be in a parsable format such as an HTML format, a YAML format, an Extensible Markup Language (XML) format, a comma separated values (CSV) format, etc.

At 314, processing may be performed similar to the processing described above (e.g., with respect to block 314).

Figure 4:
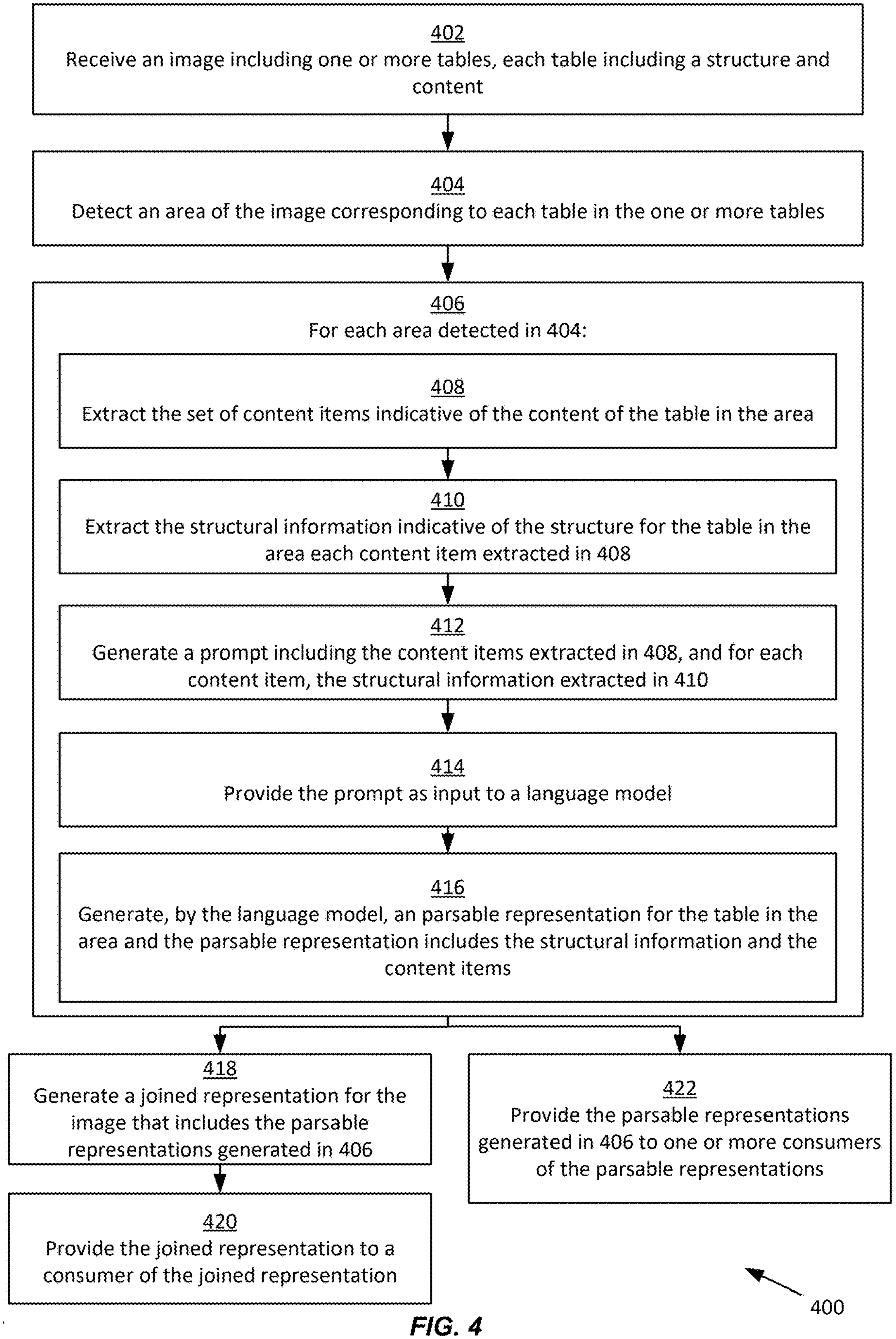
FIG. 4 is a third simplified flow diagram for generating a parsable table using an image, according to an example embodiment.

FIG. 4 is a third simplified flow diagram 400 for generating a parsable table using an image, according to an example embodiment. The third flow diagram 400 illustrates an exemplary process that may be performed by one or more components of the table extraction system 100 described above.

At 402, an image may be received. The image may be received by a table extraction system (e.g., table extraction system 100), table detection system (e.g., table detection system 104) and/or an information recognition system (e.g., tabular data recognition system 106).

The image may be the image 102 described above. The image may include one or more tables. A table in the image may include a structure and content. The structure and content of a table have been described in more detail above.

The image may be received from a user device (e.g., a mobile phone, a personal computer, a tablet, a camera, etc.). The image may be received from a repository of images. The image may correspond to a request (e.g., from the user device) to generate an parsable representation of the table included in the image. The request may include an indication of where to transmit and/or store the parsable representation of the image.

At 404, a table location area of the image corresponding to each table included in the image may be determined. The table location area may be an area of the image that includes one of the one or more tables. The table location area may be determined using a table detection system (e.g., table detection system 104). The table location area may be determined as described above.

At block 406, a sub-process that can be performed for each table location area detected in block 404 is illustrated. The sub-process can include blocks 408, 410, 412, 414, and 416.

At 408, a set of content items can be extracted from the table corresponding to the table location area. The set of content items may be indicative of the content of a table in the image included in the table location area. The table may be included in the area of the image identified by the table location area. In certain embodiments, the image received in block 402 and the table location area are used at block 408 to extract the set of content items from the table. In certain embodiments, a second image derived from a portion of the image received in block 402 defined by the table location area is used at block 408 to extract the set of content items from the table. The set of content items may be extracted from the table corresponding to the table location area using an information recognition system (e.g., the tabular data recognition system 106). The set of content items may be extracted from the table corresponding to the table location area in a similar manner as described in block 306.

At 410, structural information for each content item extracted in block 408 may be extracted. The structural information may be indicative of the structure of the table. The structural information may be extracted using an optical character recognition model that is the same or different than a first optical character recognition model used to extract the set of content items. The structural information may correspond to one or more content items in the set of content items. The structural information is described above in further detail.

At 412, a prompt may be generated. The prompt may include the set of content items and structural information associated with the set of content items. The prompt generated may be similar to the prompt generated described above (e.g., with respect to block 308). The prompt may be generated by a prompt generation system (e.g., prompt generation system 108).

At 414, the prompt may be provided as input to an artificial intelligence model (e.g., a language model (e.g., language model 110)). The prompt may be generated as described above (e.g., with respect to block 310).

At 416, the artificial intelligence model may use the prompt to generate a parsable representation. The parsable representation may be generated for one of the table location areas detected in block 404. The parsable representation may correspond to the table included in the table location area. The parsable representation may include the structural information indicative of the structure of the table defined by the table location area. The parsable representation may include the one or more content items of the set of content items and the content items may be indicative of the content of the table defined by the table location area. Block 416 may include processing as described above with respect to block 312. The processing described with respect to block 416 may be performed by the language model 110 described above.

At 418, a single joined representation for the image may be generated. The single joined representation may be parsable. Block 418 may be performed after two or more parsable representations have been generated. The single joined representation may be generated by appending a second parsable representation to a first parsable representation. For example, the single joined representation may be generated by appending a second portion of HTML text to a second first portion of HTML text. The single joined representation may include two or more parsable representations that represent two or more respective tables included in the image received at block 402. The two or more parsable representations may have the same format (e.g., HTML) and/or may be generated by the same (or different) language models.

In certain embodiments, the single joined representation includes a first parsable representation of a table in a position relative to a second parsable representation that is the same as the corresponding first table and second table included in the image received at block 402. For example, the image received in block 402 may have included a first table represented on a left side of the image and a second table represented on a right side of the image. The single joined representation may include a first parsable representation of the first table and a second parsable representation of the second table such that the single joined parsable representation includes content and structural information from the first table and the second table, and the single joined parsable representation of the first table and the second table are positioned such that the parsable representation of the first table is to the left of the parsable representation of the second table.

At 420, the joined representation including two or more parsable representations joined into a single joined parsable representation may be provided to a consumer of the single joined representation. The consumer may be a user device. The consumer may be a storage system, an artificial intelligence model training system, an artificial intelligence model tuning system, and/or an artificial intelligence model inference system, etc. In certain embodiments, the single joined representation is provided to more than one consumer.

At 422, the parsable representation generated by the sub-processing performed in block 406 may be provided to one or more consumers. The consumer may be a user device. The consumer may be a storage system, an artificial intelligence model training system, an artificial intelligence model tuning system, and/or an artificial intelligence model inference system, etc. In certain embodiments, the parsable representation of tables included in the image defined by respective table location areas may be provided to respective consumers. The consumers of the extracted parsable representation may be determined based on one or more content items, the structural information, etc. The consumer to provide the parsable representation to may have been identified in the prompt, may be a default consumer, or may be indicated in a request received by the table extraction system (e.g., when receiving the image).

FIG. 5 is an example of an image 500 that may be input to a table extraction system (e.g., table extraction system 100), according to an example embodiment. The image 500 may be the same as image 102 described above. The image may be provided to the table extraction system to cause the table extraction system to generate an extracted representation of the image (e.g., a parsable representation).

Image 500 includes content (e.g., "Variable," "charges," "GST," "Total Current Charges," "$," "$908,123.19"). Image 500 includes a structure (e.g., the text "GST" is at a specific location (e.g., coordinate position, pixel position, relative to one or more content items) in the image.

Figure 6:
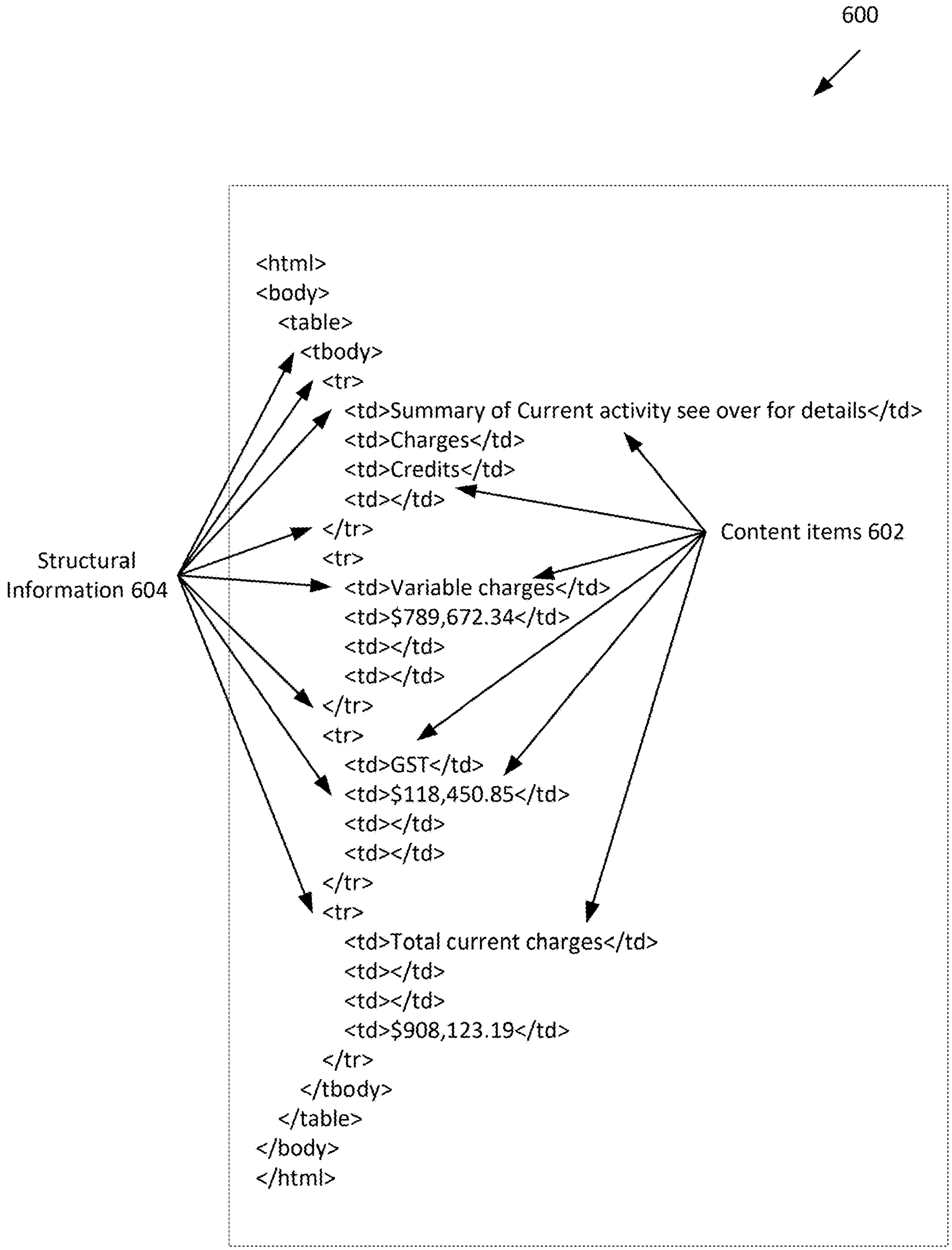
FIG. 6 is an example of an output that may be generated by a table extraction system, according to an example embodiment.

FIG. 6 is an example of an output 600 that may be generated by a table extraction system (e.g., table extraction system 100), according to an example embodiment. The output 600 may be generated by the table extraction system after receiving an image (e.g., image 500) as input. The output is formatted as HTML text. However, as described above, other forms of output are also possible using the table extraction system. The output may include structural information 604 of a table in the image. The output may include content items 602 of the table in the image. In the illustration, only some of the structural information 604 and content items 602 are explicitly labeled, but one of ordinary skill in the art with the benefit of the present disclosure would recognize the other portions of the output that include structural information and content items. In certain embodiments, the output 600 may include one or more portions that represent attributes included in the image (e.g., bolded text, colors, line styles, etc.).

FIG. 7 is an example of a rendering 700 generated by an example output (e.g., output 600) generated by a table extraction system (e.g., table extraction system 100), according to an example embodiment. The rendering 700 may be generated using an HTML rendering application (e.g., a web browser) with the output that is parsable. The rendering 700 may display at least some of the content and/or structure included in the image (e.g., image 500) used to generate the example output and/or rendering 700.

Examples of Infrastructure Architectures for Providing Cloud Services

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
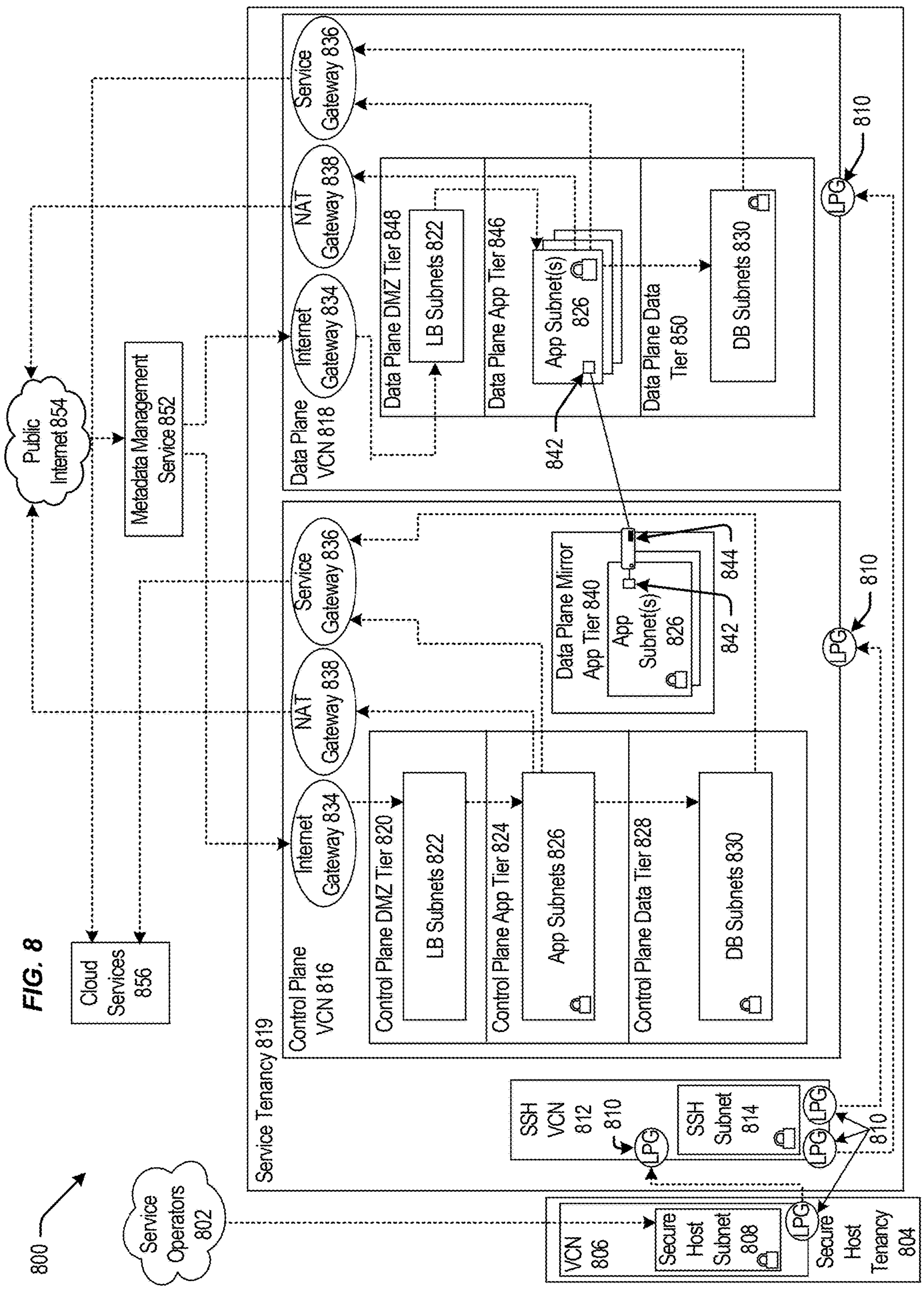
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
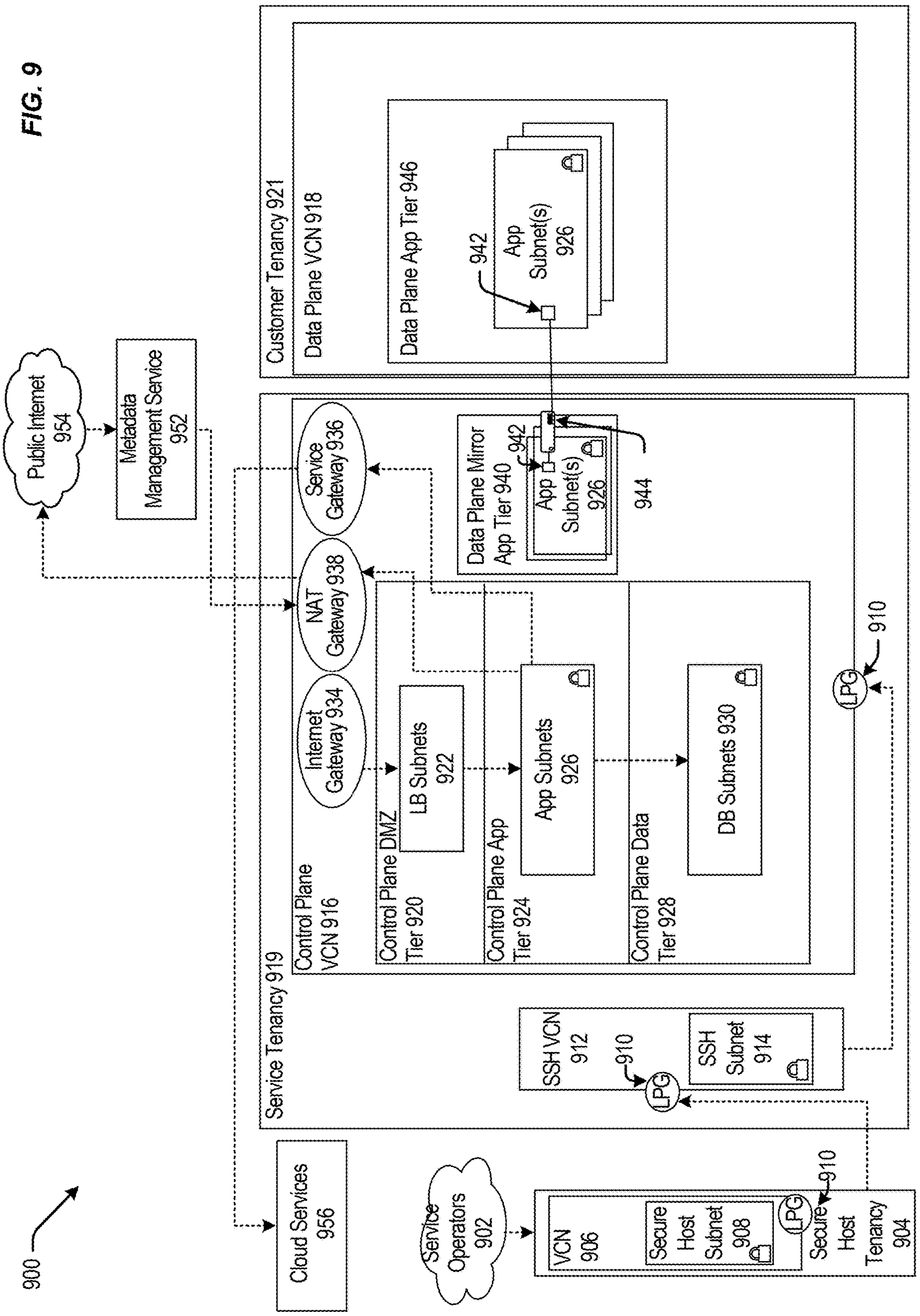
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
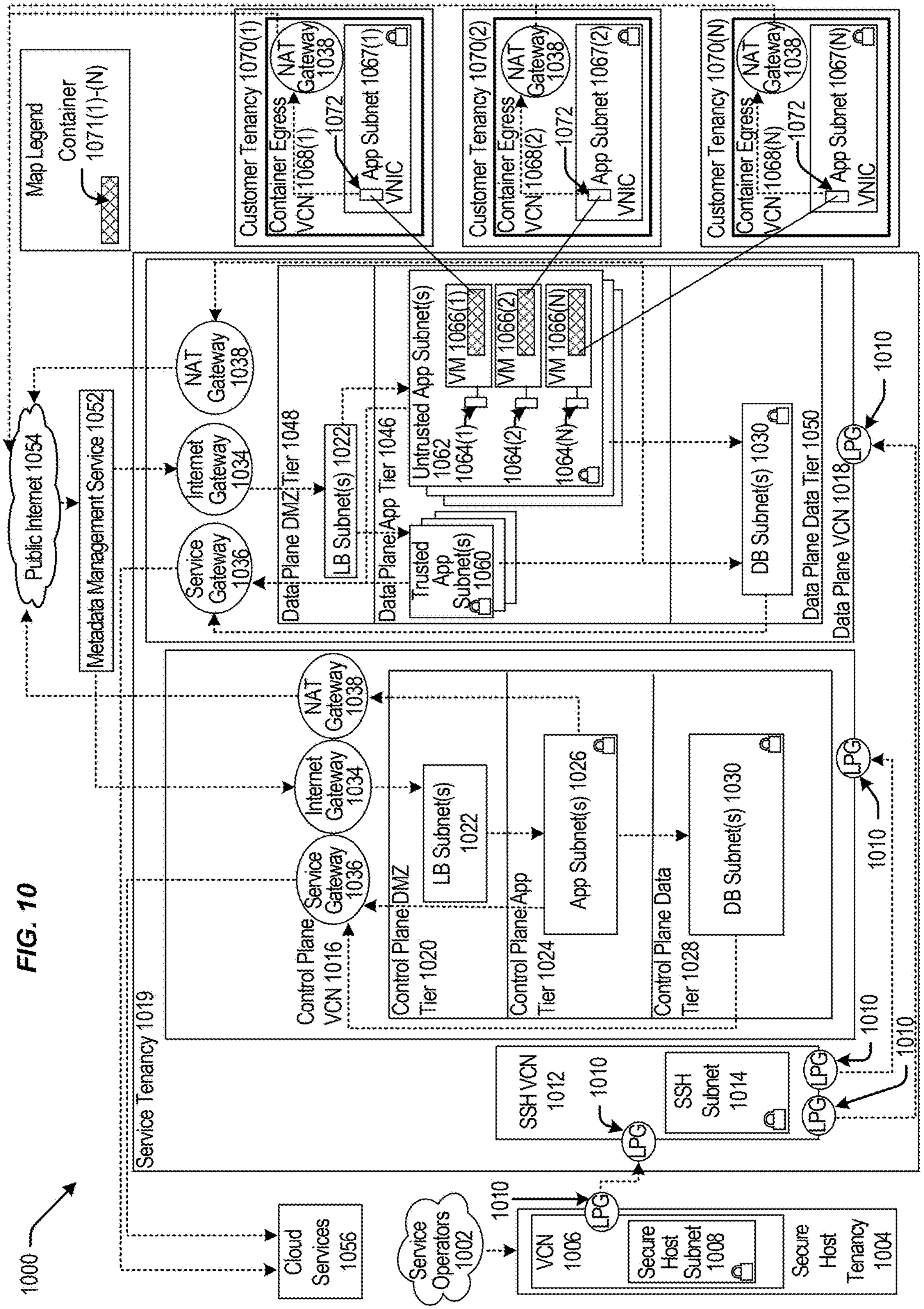
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICS 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
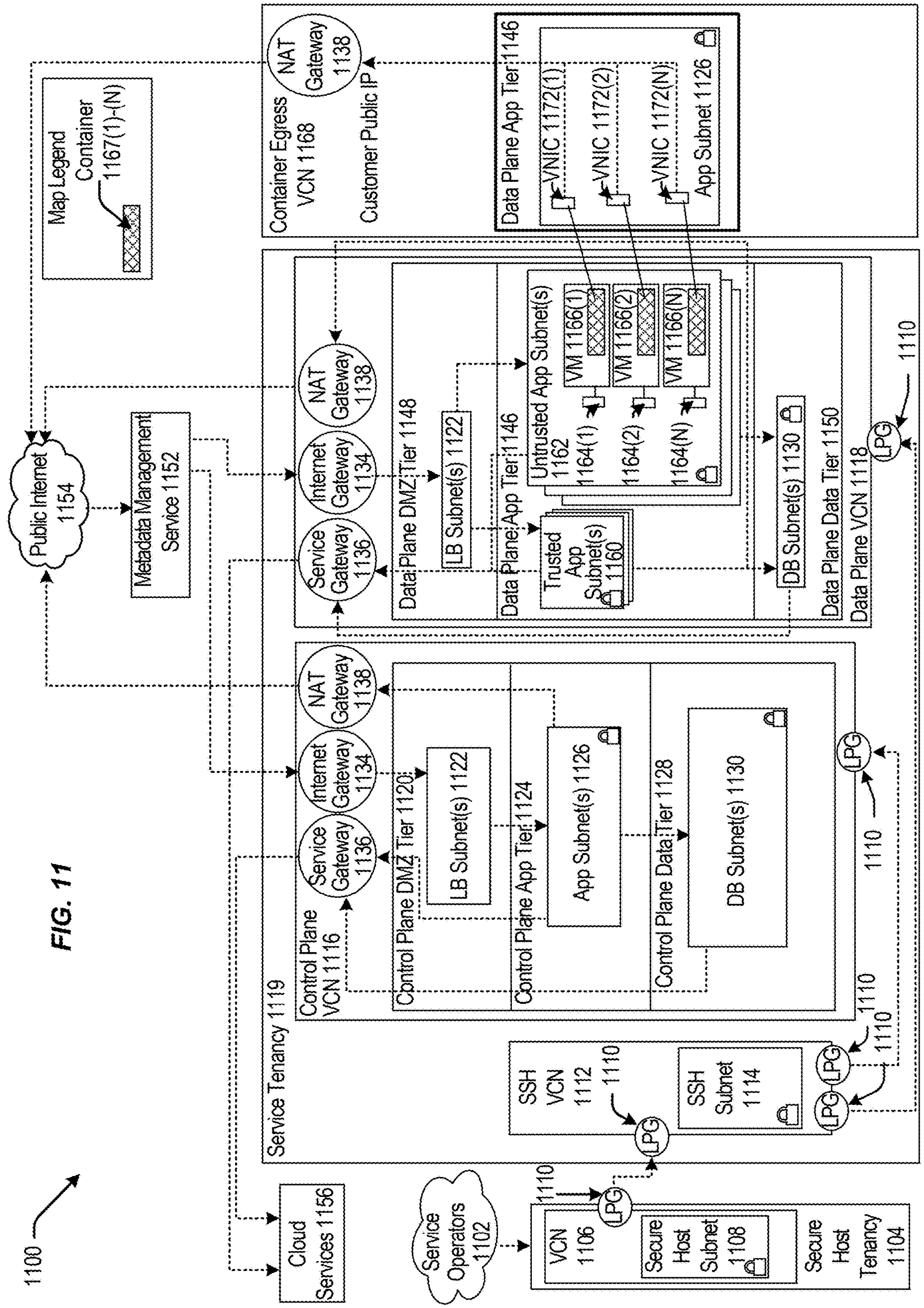
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
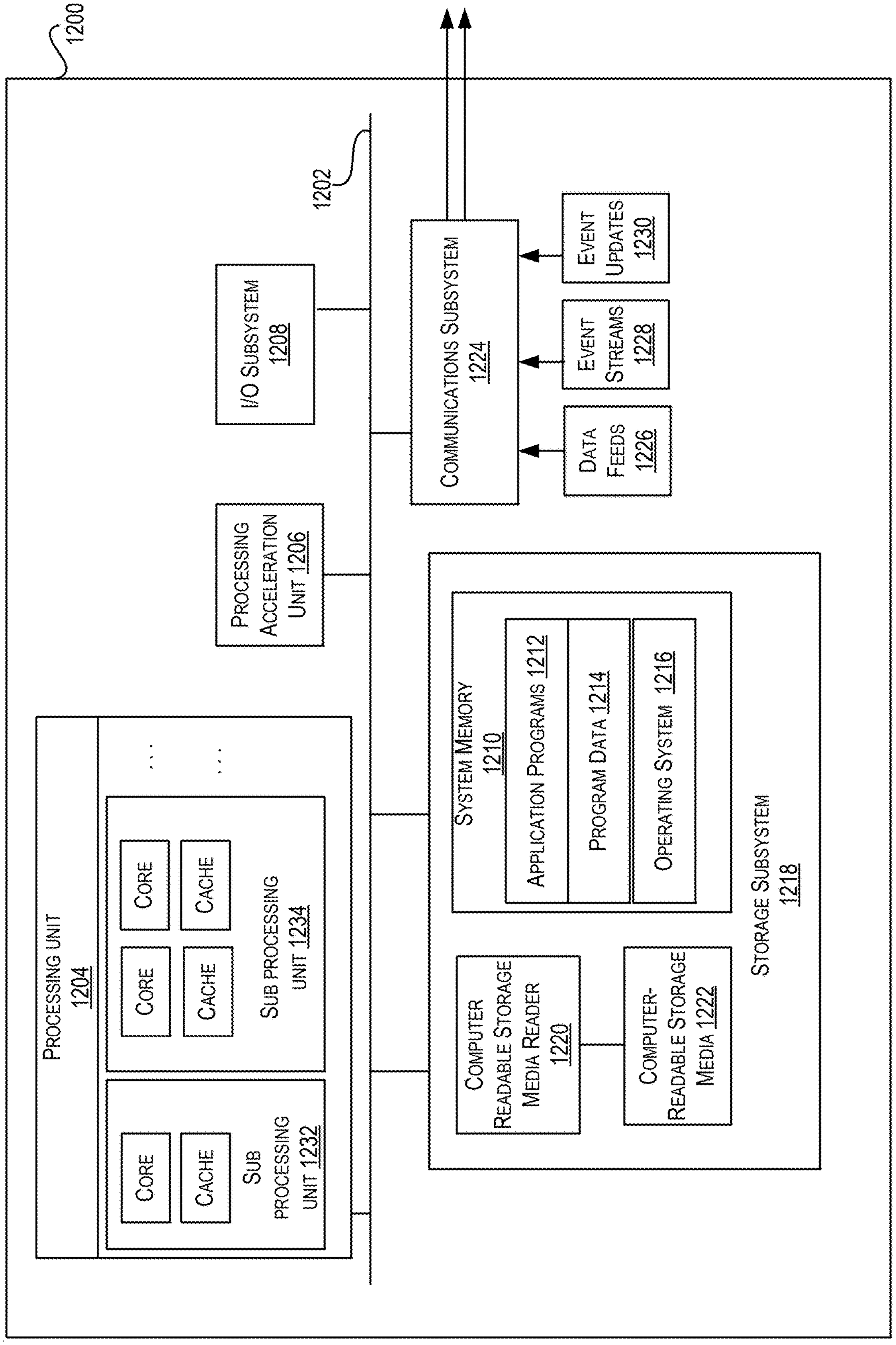
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

detecting, within an image, a first area that includes a first table;

extracting, from the first area of the image, tabular data for the first table, the tabular data comprising a first plurality of content items in the first table and first structural information, wherein the first structural information defines a spatial location for each content item of the first plurality of content items within the image;

generating a structured prompt that includes the first plurality of content items and the first structural information, wherein generating the structured prompt comprises serializing each content item of the first plurality of content items with its corresponding spatial location into a single data string that includes prompt part identifiers to delineate the first plurality of content items and their spatial locations;

providing the structured prompt as input to a first large language model; and responsive to providing the structured prompt as input to the first large language model, generating, by the first large language model, a first parsable representation of the first table by interpreting the serialized spatial locations of the first plurality of content items within the single data string to reconstruct a logical structure of the first table, wherein the first parsable representation is in a first format and includes the first plurality of content items arranged according to the reconstructed logical structure.

2. The method of claim 1, wherein the prompt comprises:

an example of task performance comprising:

an example plurality of content items and an example structural information to input to the first large language model; and an example parsable representation generated based at least in part on the example plurality of content items and the example structural information.

3. The method of claim 1, wherein extracting the tabular data comprises:

for each content item in the first plurality of content items, determining, location information for the content item, the location information for the content item indicative of a location of the content item within the image; and wherein the first structural information for the first table includes the location information for the first plurality of content items represented.

4. The method of claim 1, wherein:

at least one content item included in the first plurality of content items comprises at least one of: a word, a character, a symbol, or a value; and the first structural information includes at least two coordinate values identifying a bounding box around the at least one content item.

5. The method of claim 1, wherein the first format is at least one of: a HyperText Markup Language (HTML) format, an Extensible Markup Language (XML) format, or a comma separated values (CSV) format.

6. The method of claim 1, wherein the image is represented in a second format, different than the first format, the second format is at least one of: a Portable Document Format (PDF), a Joint Photographic Expert Group (JPEG) format, a Portable Network Graphics (PNG) format, Tag Image File Format (TIFF), or a Graphic Interchange Format (GIF).

7. The method of claim 1, further comprising:

receiving a request from a requester to perform a table extraction operation on the image, the request further identifying the first format; and transmitting the first parsable representation of the first table to the requester.

8. The method of claim 1, wherein the image includes a second table and the method further comprises:

detecting, within the image, a second area that includes the second table;

extracting, from the second area of the image, second tabular data for the second table, the extracted second tabular data comprising a second plurality of content items in the second table and second structural information for the second table;

generating a second prompt that includes the second plurality of content items and the second structural information;

providing the second prompt as input to the first large language model; and responsive to providing the second prompt as input to the first large language model, generating, by the first large language model, a second parsable representation of the second table, wherein the second parsable representation is in a second format and includes the second plurality of content items of the second table, and the second structural information of the second table in the image.

9. The method of claim 8, wherein the first table is in a first orientation in the image and the second table is in a second orientation in the image, the second orientation is different than the first orientation.

10. The method of claim 1, wherein the image includes a second table and the method further comprises:

detecting, within the image, a second area that includes the second table;

extracting, from the second area of the image, second tabular data for the second table, the extracted second tabular data comprising a second plurality of content items in the second table and second structural information for the second table;

generating a second prompt that includes the second plurality of content items and the second structural information;

providing the second prompt as input to a second large language model different from the first large language model; and responsive to providing the second prompt as input to the second large language model, generating, by the second large language model, a second parsable representation of the second table, wherein the second parsable representation is in a second format and includes the second plurality of content items of the second table, and the second structural information of the second table in the image.

11. The method of claim 10, further comprising:

creating a single joined parsable representation that includes both the first parsable representation of the first table and the second parsable representation of the second table.

12. The method of claim 1, wherein the prompt further comprises: one or more examples including a first example, wherein the first example comprises a first portion and a second portion, the first portion identifying a plurality of example content items and corresponding example structural information for each example content item in the plurality of example content items, and the second portion identifying an example parsable representation corresponding to the first portion.

13. A system comprising:

one or more storage media storing instructions; and one or more processors configured to execute the instructions to cause the system to perform processing comprising:

detecting, within an image, a first area that includes a first table;

extracting, from the first area of the image, tabular data for the first table, the tabular data comprising a first plurality of content items in the first table and first structural information, wherein the first structural information defines a spatial location for each content item of the first plurality of content items within the image;

generating a structured prompt that includes the first plurality of content items and the first structural information, wherein generating the structured prompt comprises serializing each content item of the first plurality of content items with its corresponding spatial location into a single data string that includes prompt part identifiers to delineate the first plurality of content items and their spatial locations;

providing the structured prompt as input to a first large language model; and responsive to providing the structured prompt as input to the first large language model, generating, by the first large language model, a first parsable representation of the first table by interpreting the serialized spatial locations of the first plurality of content items within the single data string to reconstruct a logical structure of the first table, wherein the first parsable representation is in a first format and includes the first plurality of content items arranged according to the reconstructed logical structure.

14. The system of claim 13, wherein the processing further comprises:

extracting each content item in the first plurality of content items from the first area of the image.

15. The system of claim 13, wherein the processing further comprises:

for each content item in the first plurality of content items, determining, location information for the content item, the location information for the content item indicative of a location of the content item within the image; and wherein the first structural information for the first table includes the location information for the first plurality of content items represented.

16. The system of claim 13, wherein the processing further comprises:

fine tuning the first large language model to enable the first large language model to extract tables from images; and wherein providing the prompt as input to the first large language model comprises providing the prompt to the first large language model after performing the fine tuning.

17. The system of claim 16, wherein fine-tuning the first large language model comprises performing at least one of: full fine-tuning or parameter efficient fine-tuning.

18. The system of claim 13, wherein the first large language model is a decoder-only model or an encoder-decoder model.

19. One or more non-transitory computer-readable storage media storing instructions that, upon execution by one or more processors of a system, cause the system to perform operations comprising:

detecting, within an image, a first area that includes a first table;

extracting, from the first area of the image, tabular data for the first table, the tabular data comprising a first plurality of content items in the first table and first structural information, wherein the first structural information defines a spatial location for each content item of the first plurality of content items within the image;

generating a structured prompt that includes the first plurality of content items and the first structural information, wherein generating the structured prompt comprises serializing each content item of the first plurality of content items with its corresponding spatial location into a single data string that includes prompt part identifiers to delineate the first plurality of content items and their spatial locations;

providing the structured prompt as input to a first large language model; and responsive to providing the structured prompt as input to the first large language model, generating, by the first large language model, a first parsable representation of the first table by interpreting the serialized spatial locations of the first plurality of content items within the single data string to reconstruct a logical structure of the first table, wherein the first parsable representation is in a first format and includes the first plurality of content items arranged according to the reconstructed logical structure.

20. The non-transitory computer-readable storage media of claim 19, wherein the structured prompt comprises an instruction for generating the first parsable representation.

* * * * *